United States Patent
He et al.

(10) Patent No.: US 7,062,444 B2
(45) Date of Patent: Jun. 13, 2006

(54) ARCHITECTURE FOR DSR CLIENT AND SERVER DEVELOPMENT PLATFORM

(75) Inventors: Liang He, Shanghai (CN); ChuanQuan Xie, Shanghai (CN); Song Cui, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 374 days.

(21) Appl. No.: 10/057,705

(22) Filed: Jan. 24, 2002

(65) Prior Publication Data

US 2003/0139930 A1 Jul. 24, 2003

(51) Int. Cl.
*G10L 15/00* (2006.01)

(52) U.S. Cl. .................... 704/275; 345/727
(58) Field of Classification Search ............ 704/270, 704/275; 379/88.03; 345/727
See application file for complete search history.

(56) References Cited

U.S. PATENT DOCUMENTS

| | | | |
|---|---|---|---|
| 6,018,710 A * | 1/2000 | Wynblatt et al. | 704/260 |
| 6,073,100 A | 6/2000 | Goodridge, Jr. | |
| 6,188,985 B1 * | 2/2001 | Thrift et al. | 704/275 |
| 6,195,632 B1 | 2/2001 | Pearson | |
| 6,226,606 B1 | 5/2001 | Acero et al. | |
| 6,269,336 B1 * | 7/2001 | Ladd et al. | 704/270 |
| 6,404,859 B1 | 6/2002 | Hasan | |
| 6,594,628 B1 * | 7/2003 | Jacobs et al. | 704/231 |
| 6,604,075 B1 * | 8/2003 | Brown et al. | 704/270.1 |
| 6,615,171 B1 * | 9/2003 | Kanevsky et al. | 704/246 |
| 6,662,163 B1 * | 12/2003 | Albayrak et al. | 704/275 |
| 6,738,743 B1 | 5/2004 | Sharma et al. | |
| 6,748,375 B1 | 6/2004 | Wong et al. | |
| 6,754,200 B1 | 6/2004 | Nishimura et al. | |
| 6,801,604 B1 | 10/2004 | Maes et al. | |
| 2002/0006124 A1 | 1/2002 | Jimenez et al. | |
| 2002/0022453 A1 | 2/2002 | Balog et al. | |
| 2002/0147579 A1 | 10/2002 | Kushner et al. | |
| 2002/0184197 A1 | 12/2002 | He et al. | |
| 2002/0184373 A1 | 12/2002 | Maes | |
| 2002/0194388 A1 | 12/2002 | Boloker et al. | |
| 2003/0093265 A1 | 5/2003 | Xu et al. | |
| 2003/0139930 A1 | 7/2003 | He et al. | |
| 2003/0161298 A1 | 8/2003 | Bergman et al. | |

(Continued)

FOREIGN PATENT DOCUMENTS

WO WO 0058942 A2 * 10/2000

(Continued)

OTHER PUBLICATIONS

Boersma, Paul; Accurate Short-Term Analysis Of The Fundamental Frequency And The Harmonics-To-Noise Ratio Of A Sampled Sound; Institute Of Phonetic Sciences, University of Amsterdam; Proceedings 17 (1993), pp. 97-110.

(Continued)

*Primary Examiner*—Daniel Abebe
(74) *Attorney, Agent, or Firm*—Blakely, Sokoloff, Taylor & Zafman LLP

(57) ABSTRACT

A comprehensive, practical and efficient architecture for a DSR client and server development platform is disclosed. A system comprising: DSR client module for capturing speech, extracting speech features, interpreting markup content and displaying content; DSR gateway module coupled for communication with the DSR client module, the DSR gateway module for receiving a markup document, interpreting tag elements of the markup document, and dynamically generating grammar from the markup document, and controlling display content navigation by speech recognition; and DSR document server coupled for communication with the DSR gateway module, the DSR document server for processing requests from the DSR gateway module and for producing a markup document in response.

26 Claims, 8 Drawing Sheets

U.S. PATENT DOCUMENTS

| | | |
|---|---|---|
| 2004/0056885 A1 | 3/2004 | Azami et al. |
| 2004/0057456 A1 | 3/2004 | He et al. |
| 2004/0199502 A1 | 10/2004 | Wong et al. |
| 2005/0059426 A1 | 3/2005 | Aarnio et al. |

FOREIGN PATENT DOCUMENTS

| | | |
|---|---|---|
| WO | WO 01/35389 A1 | 5/2001 |
| WO | WO 0195312 A1 * | 12/2001 |

OTHER PUBLICATIONS

Hermes, DIK J.; Measurement of pitch by subharmonic summation; J. Acoust. Soc. Am. 83 (1), Jan. 1988, © 1988 Acoustical Society of America, pp. 257-264.

Liu, Ph.D., Sharlene, et al.; The Effect of Fundamental Frequency on Mandarin Speech Recognition; 5th International Conference on Spoken Language Processing; 30th Nov.-4th Dec. 1998, Sydney, Australia, ICSLP '98 Proceedings, Th4R9, vol. 6, pp. 2647-2650.

Pearce, David, *Enabling New Speech Driven Services for Mobile Devices: An overview of the ETSI standards activities for Distributed Speech Recognition Front-ends*, AVIOS 2000: The Speech Applications Conference, May 22-24, 2000, San Jose, CA, USA., <http://www.etsi.org/T_news/Documents/AVIOS DSR paper.pdf>, 12 pages.

Rabiner, Lawrence R., et al; A Comparative Performance Study of Several Pitch Detection Algorithms; IEEE Transactons On Acoustics, Speech, And Signal Processing, vol. ASSP-24, No. 5, Oct. 1976, pp. 399-418.

*Distributed Speech Recognition—Aurora*, Oct. 1, 2002, <http://www.etsi.org/technicalactiv/dsr/dsr.htm>, pp. 1-3.

*Speech Processing, Transmission and Quality aspects (STQ); Distributed speech recognition; Front-end feature extraction algorithm; Compression algorithms*, ETSI ES 201 108 V1.1.2 (Apr. 2000), ETSI Standard, © European Telecommunications Standards Institute 2000, F-06921 Sophia Antipolis Cedex—France, pp. 1-20.

WebSphere Transcoding Publisher, IBM® Products & Services> Software> Web Application Servers, http://www-3.ibm.com/software/webservers/transcoding/about.html, 4 pages.

Written Opinion for PCT/US 02/35949, mailed Oct. 23, 2003, 1 page.

Search Report for PCT/US 02/35949, mailed Feb. 6, 2003, 2 pages.

Mathis et al., "TCP Selective Acknowledgement Options", RFC 2018, Internet Engineering Task Force, Internet Draft, Oct. 1996.

Allman et al., "Increasing TCP's Initial Window", RFC 2414, Internet Engineering Task Force, Internet Draft, Sep. 1998.

Coyner et al., "Distributed speech recognition services (DSRS)", International Symposium on Multimedia Software Engineering, Proceedings, 11-13 Dec. 2000, pp. 59-66.

Zhang et al., "The study on distributed speech recognition system", ICASSP '00, Proceedings, 5-9 Jun. 2000, vol. 3, pp. 1431-1434.

Yeping Su, et al., "An Improved Cumulant-Based Blind Speech Separation Method", Intel Architecture Development Lab, 2000 IEEE, Intel Corporation, pp. 1867-1870.

Cheng Zhang, et al., "The Study on DSR Transmissions Over GPRS", Intel China Ltd., 2002 IEEE, pp. II-2081 through II-2084, Intel Corporation, PRC.

Weiqi Zhang, et al., "The Study on Distributed Speech Recognition System", IEEE Procs, ICASSP, col. 3, Jun. 2000, Intel Architecture Development Lab, Lernout & Hauspie Asia Pacific, pp. 1431-1434.

* cited by examiner

ARCHITECTURE FOR DSR CLIENT AND SERVER DEVELOPMENT PLATFORM

RELATED APPLICATION

This application is related to co-pending patent application Ser. No. 10/057,161 entitled, "A Data Transmission System and Method for DSR Application over GPRS", filed Jan. 24, 2002, which application is assigned to the assignee of the present application.

FIELD OF THE INVENTION

The present invention relates to distributed speech recognition (DSR) technology. More specifically, the present invention relates to the architecture design, implementation, and optimization of a DSR system.

BACKGROUND OF THE INVENTION

Currently, computer-supported communication via the Internet has, in a short time, become an important determinant of social life and a driving force of economic development in all developed and developing countries. In this field, global markets with huge potential for development have formed within a very short time out of a rapidly evolving process of innovation.

In order to meet the requirements of the explosive growth of Internet technology, speech researchers have been putting a great deal of effort into integrating speech functions into Internet applications. For simple applications, voice playback and voice recording functions may be sufficient. Although computationally intensive, speech recognition functions are needed for complex applications such as voice access to the World Wide Web on a personal digital assistant or wireless phone. DSR can effectively balance computational loads and utilize the bandwidth of heterogeneous networks for voice recognition applications.

Generally, there are three alternative strategies in the design of DSR architectures. The first strategy is server-only processing, in which all processing is done at the server side and the speech signal is transmitted to the server either through the Internet by using speech coding or via a second channel like telephone. Because all the recognition processing takes place at the server side, this approach has the smallest computational and memory requirements on the client, thereby allowing a wide range of client machines to access the speech-enabled application. The disadvantage of this approach is that users cannot access applications through a low-bandwidth connection.

The second conventional strategy is client-only processing, in which most of the speech processing is done at the client side and the results are transmitted to the server. The typical advantages are that a high-bandwidth connection is not required and recognition can be based on high-quality speech, because the sampling and feature extraction takes place at the client side. This approach is also less dependent on the transmission channel and is therefore more reliable. However, the type of clients that the speech-enabled applications can support is significantly limited with this approach because the client must be powerful enough to perform the heavy computation that takes place in the speech recognition process.

The third strategy is a client-server approach. In the client-server DSR processing model, front-end processing is done at the client side. The speech features are then transmitted to the server and finally the processing of the speech decoding and language understanding is performed at the server side.

At present, the client-server based DSR approach has not been exploited. This approach requires a great deal of effort to integrate a client-server based DSR system into Internet and wireless communication applications.

The difficulty of implementing an efficient client-server DSR architecture relates to diverse handheld device designs, network infrastructure complexity, network gateway or server diversity, and unstructured information content. To make a client-server based DSR system happen in industry and the commercial market, the development efforts of many diverse areas are needed. As such, a comprehensive, practical, and efficient architecture for DSR in a client/server design has not been achieved in the conventional art.

BRIEF DESCRIPTION OF THE DRAWINGS

The features of the invention will be more fully understood by reference to the accompanying drawings, in which.

DETAILED DESCRIPTION

In the following detailed description, numerous specific details are set forth in order to provide a thorough understanding of the invention. However, it will be appreciated by one of ordinary skill in the art that the present invention shall not be limited to these specific details.

Figure 1:
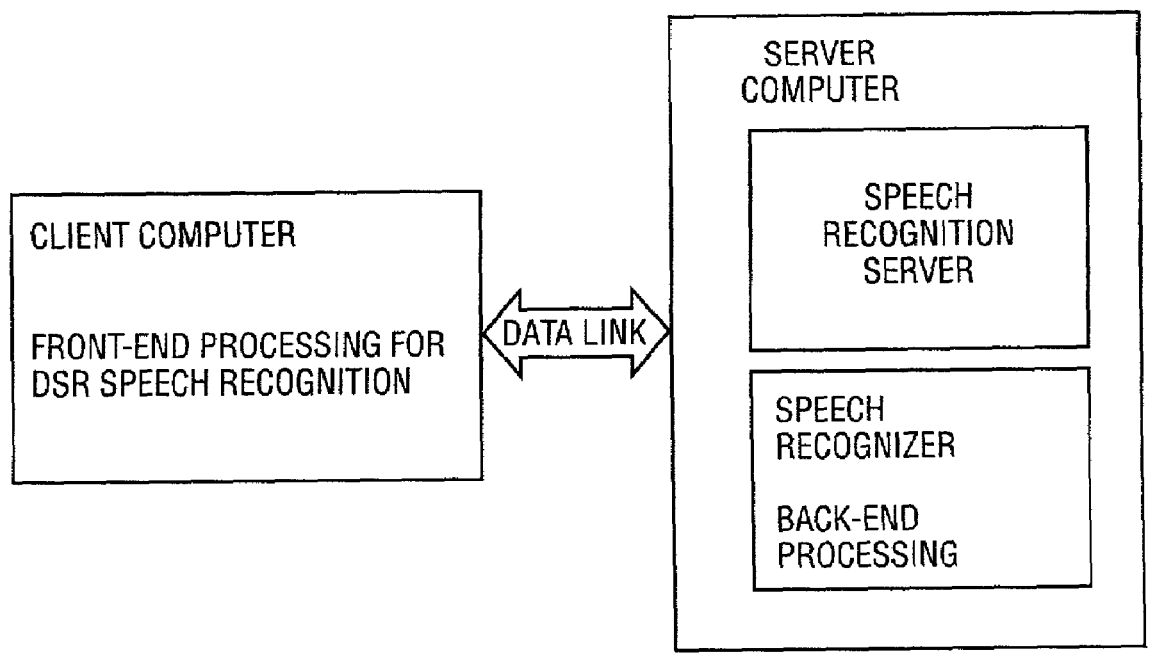
FIG. 1 illustrates a client-server based DSR system.

A DSR system based on a client-server model is presented in FIG. 1. The left block represents the structure of the client side, while the right block represents the structure of the server side. The client side is responsible for recording speech and transmitting speech data to the server side. The server side is responsible for speech recognition. With proper network bandwidth and protocols, the speech features and recognition results are transmitted between clients and servers via the public switched telephone network (PSTN) and the Internet.

The client-server approach has many benefits as follows:

Mel Frequency Capstral Coefficents (MFCC) is a common set of feature extractors used by many state-of-the-art Hidden Markov Model (HMM) based automated speech recognition (ASR) systems. The client/server DSR model can be implemented in many types of client systems.

Speech feature extractions efficiently carry the information which the speech recognition function needs. Special feature extractions can be represented in a data size that is much smaller than pure speech data.

Figure 8:
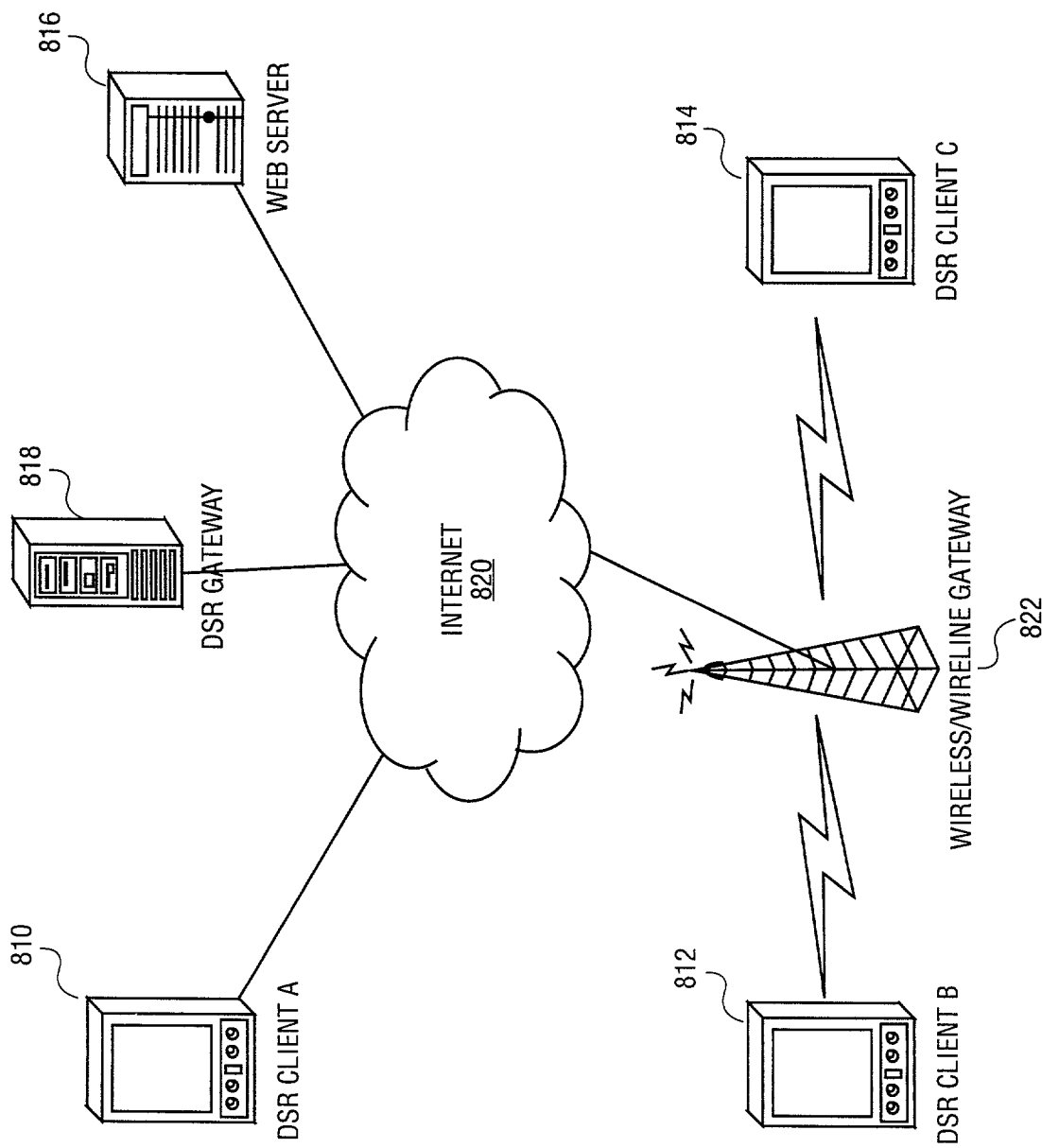
FIG. 8 illustrates an example of the network environment in which the architecture for the DSR system development platform of the present invention may be applied.

FIG. 8 schematically depicts an example of the network environment in which the architecture for the DSR system development platform of the present invention may be applied. As shown in FIG. 8, DSR clients 810, 812, and 814 can access documents from the Web server 816 via the Internet 820, particularly via the World-Wide Web ("the Web"). The Web is a well-known collection of formatted hypertext pages located on numerous computers around the world that are logically connected by the Internet 820. DSR clients 810, 812, and 814 may be personal computers or various mobile computing devices, such as personal digital assistants or wireless telephones. Personal digital assistants (PDA) are commonly known hand-held computers that can be used to store various personal information including, but not limited to, contact information, calendar information, etc. Such information can be downloaded from other computer systems or inputted by way of a stylus and pressure sensitive screen on the conventional PDA. 3Com Corporation's PALM (trademark) computers as well as computers based on Microsoft Corporation's Windows CE operating system are examples of PDAs. A user operating a mobile computing device such as a cordless handset, dual-mode cordless handset, PDA, or portable laptop computer generates control commands to access the Internet 820. The control commands may consist of digitally encoded data, dual-tone multi-frequency (DTMF), or voice commands. These control commands are transmitted to the DSR gateway 818. The DSR gateway 818 processes the control command (including performing speech recognition) from the mobile computing device and transmits requests to the Web server 816 via the Internet 820. In response to a request, the Web server 816 sends documents to the DSR gateway 818. Next, the DSR gateway 818 consolidates display contents from the document received from the Web Server 816 according to a speech recognition result produced by the DSR gateway 818. The DSR gateway then sends the consolidated display contents to the DSR client from which the command was received.

Figure 2:
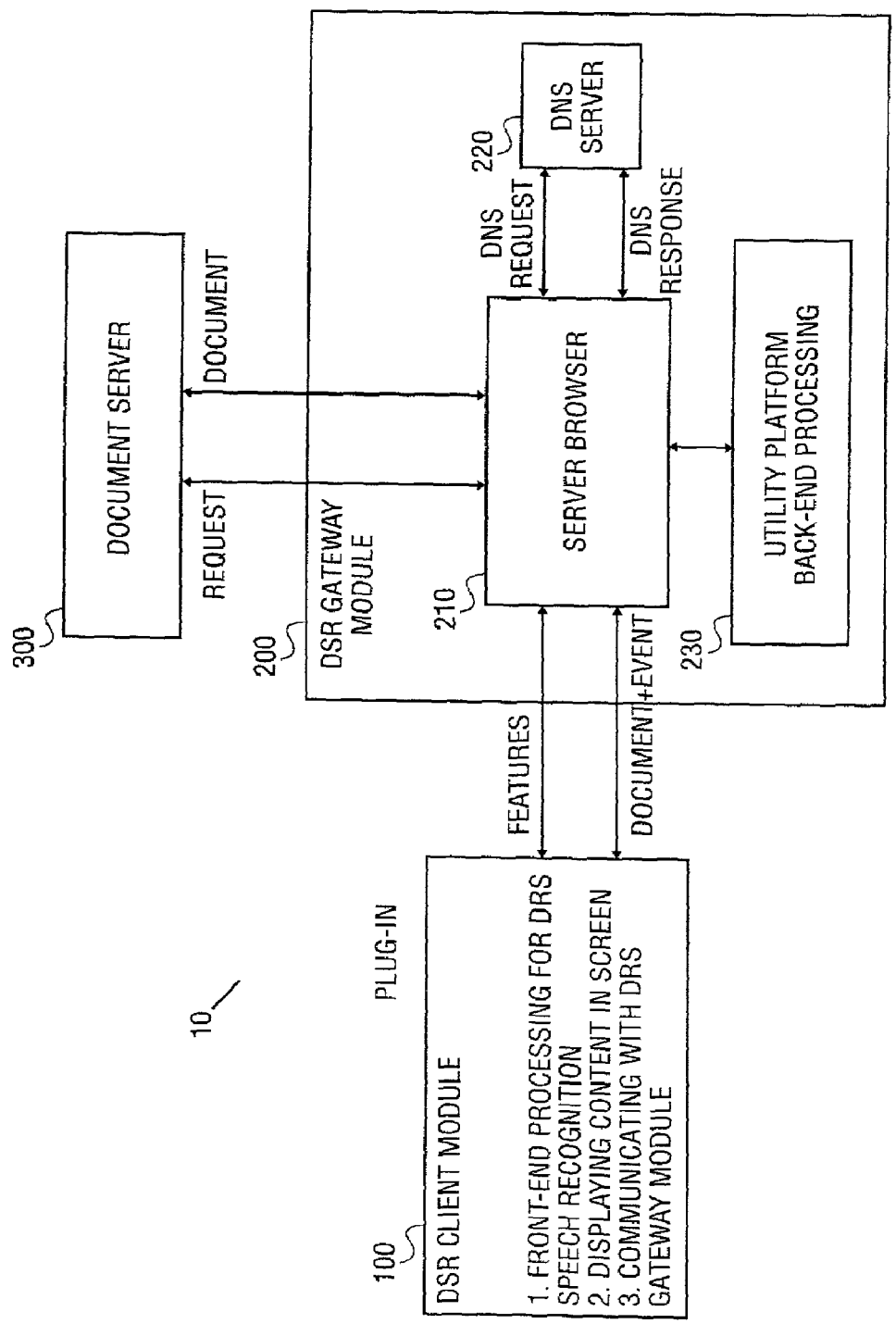
FIG. 2 illustrates the architecture for a DSR system development platform according to one embodiment of the present invention.

FIG. 2 schematically depicts one embodiment of a comprehensive, practical, and efficient architecture of a DSR client and server development platform. As shown, the embodiment of the DSR client and server development platform 10 includes: the DSR client development module 100, the DSR gateway development module 200, and the DSR document server 300. The DSR client module 100 captures speech, extracts speech features, interprets markup contents, displays information content on a client display screen, and communicates with the DSR gateway module 200. The DSR gateway module 200 receives a tagged document from the DSR document server 300. In the preferred embodiment, the tagged document can be represented as a conventional Extensible Mark-up Language (XML) document with tags added to assist the speech recognition function. In one embodiment, these XML documents modified to support DSR are denoted DSR Extensible Markup Language (DSRML) documents. The DSRML documents contain XML elements augmented to support DSR. These elements are denoted DSRML elements. The DSR Gateway module 200 interprets the DSRML elements, dynamically generates grammar from the DSRML elements, controls display content navigation by speech recognition, and communicates with the DSR client module 100 and the DSR document server 300. The DSR document server 300 processes requests from the DSR gateway module 200 and produces DSRML documents in response.

Figure 3:
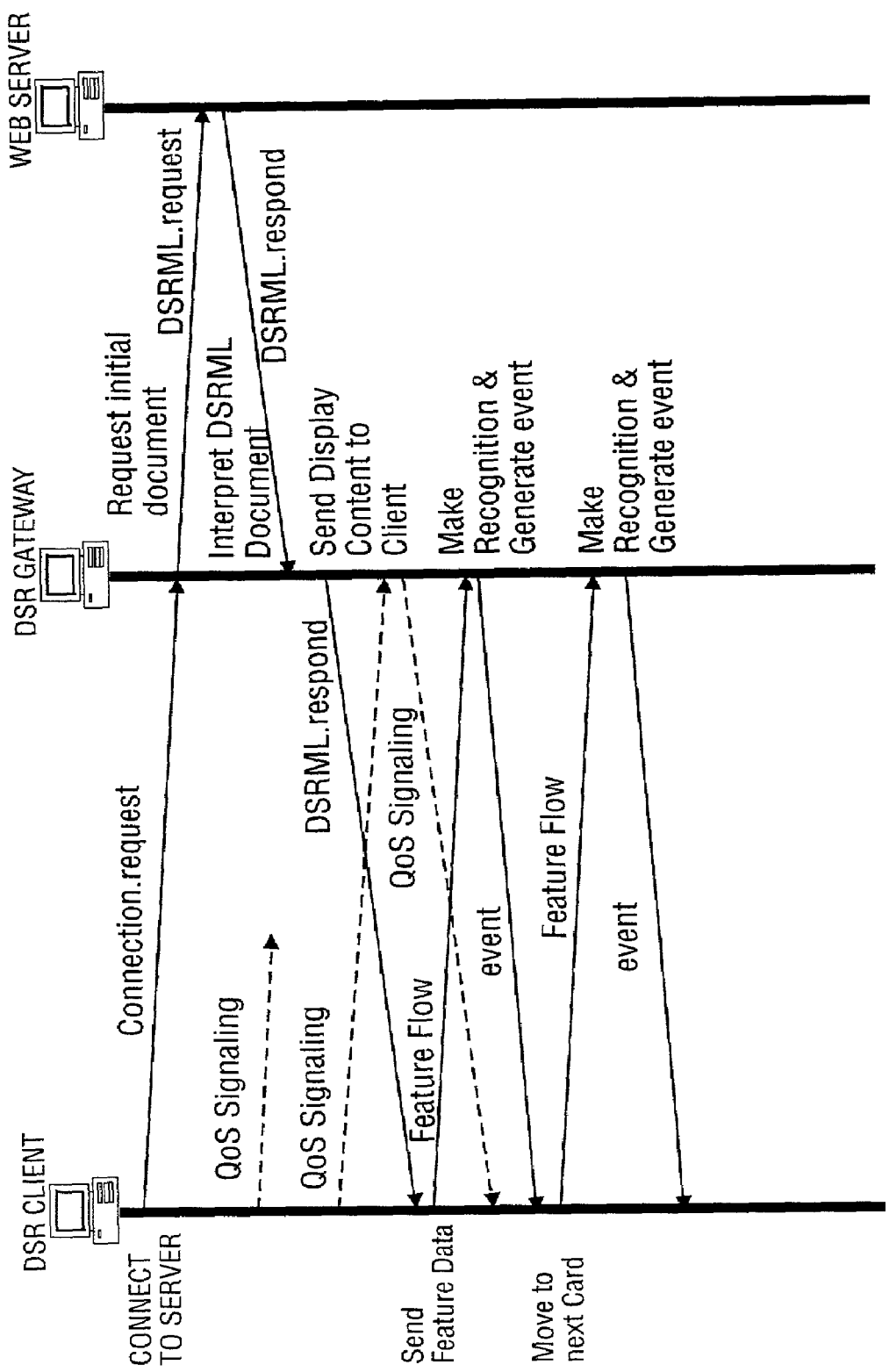
FIG. 3 illustrates a method for accessing a document by speech based on the architecture for a DSR system development platform according to the one embodiment of the present invention.

Based on such architecture of one embodiment of the present invention, the working scenario for accessing documents by speech through the Internet is provided as FIG. 3.

As shown in FIG. 3, the procedure flow of steps includes the following:

1) The DSR client 100 initiates a DSR session by negotiating with the DSR gateway 200. At the same time, the DSR client 100 sends some information (such as the type of client device and the characteristics of the user's speech, etc.) to the DSR gateway 200 and requests the initial DSRML document.

2) After receiving the DSR session initial information from the DSR client 100, the DSR gateway 200 sends a DSRML document request to the Web Server 816 (Document Server 300) with the help of a DSR Domain Name Server (DNS). Then, the Web Server 816 sends back the requested DSRML documents.

3) After receiving the DSRML documents, the DSR gateway 200 parses the DSRML documents first, interprets the document content, and compiles all the grammars that the Recognition Engine will need.

4) The DSR gateway 200 also generates display content for the DSR client 100 (which includes several cards of information organized as a document). The DSR gateway 200 then sends the display content to the DSR client 100. Then, the DSR gateway 200 waits for the client user's speech features to be received from the DSR client 100 for processing.

5) After receiving the display content from the DSR gateway 200, the DSR client 100 displays a relevant card of information.

6) The DSR client 100 enables the speech Front-End engine and waits for user utterance input.

7) Upon receipt of user utterance input, the DSR client 100 performs a Front-End algorithm, packs the speech feature data, and sends the packets out to the DSR gateway 200.

8) After receiving the speech feature data from the DSR client 100, the DSR gateway 200 starts to perform speech recognition and triggers resulting actions, including those described below.

9) If the recognition result generated by the DSR gateway 200 means that the DSR client 100 should display another information card in the document, the DSR gateway 200 sends an event (the event is the DSR gateway's 200 response to the DSR client's 100 speech feature) to the DSR client 100 with the information of the relevant card identifier. Then, the DSR client 100 displays the card and the procedure continues from step 6 above.

10) If the recognition result is not decipherable, the DSR gateway 200 sends a corresponding event to the DSR client 100.

11) If the recognition result means that the DSR client 100 needs a new document, the DSR gateway 200 sends a DSRML document request to the Web Server 816. After receiving the needed DSRML document, the procedure continues from step 3 above.

Figure 4:
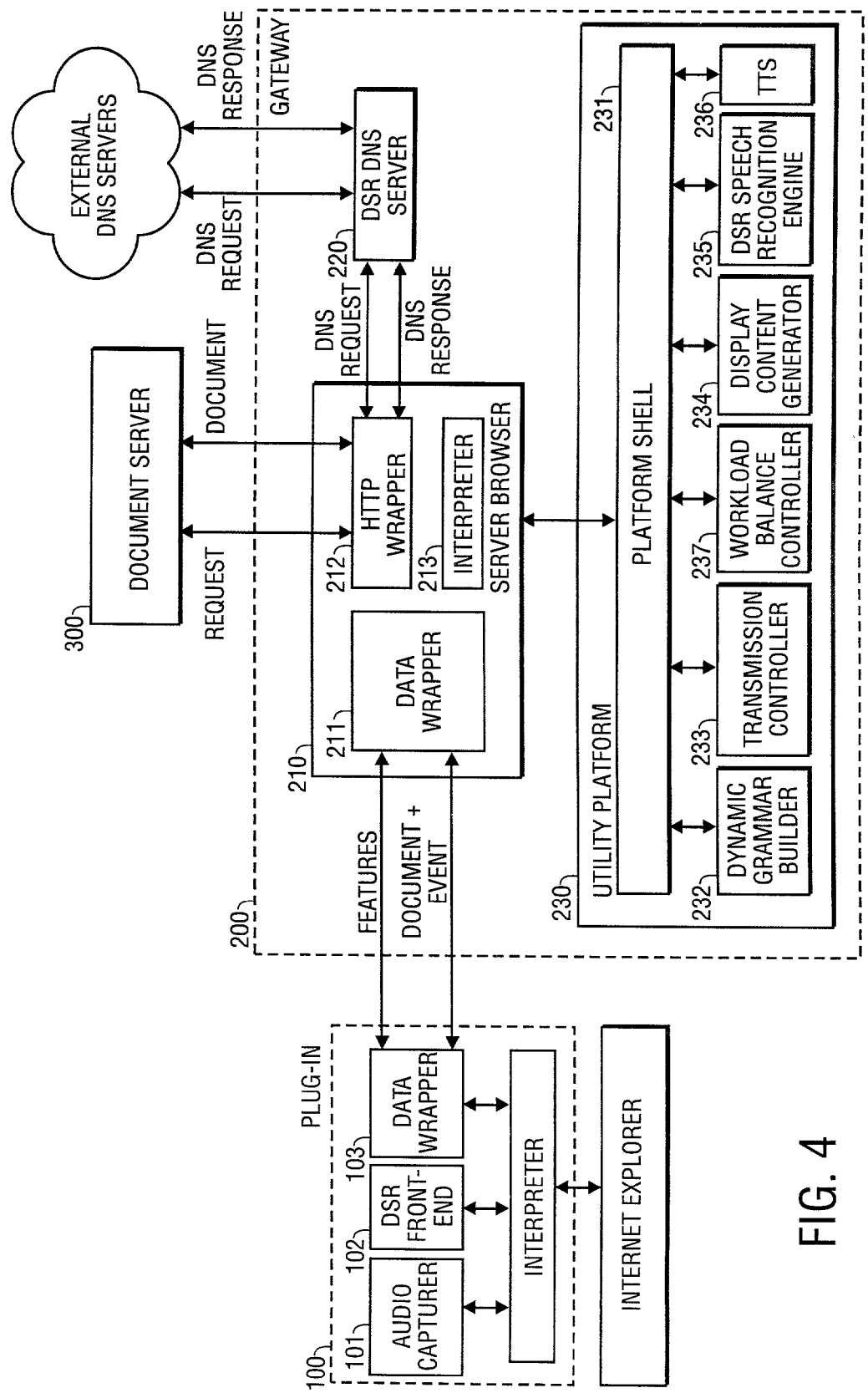
FIG. 4 illustrates the major components of the architecture shown in FIG. 2 according to the one embodiment of the present invention.

FIG. 4 illustrates the details of the architecture of one embodiment of a comprehensive, practical, and efficient DSR client and server development platform, shown in FIG. 2 according to one embodiment of the present invention.

As shown in FIG. 4, the DSR client module 100 includes: the audio capturer 101, the feature extractor (DSR Front End) 102, the data wrapper 103, and the interpreter 104; each of which performs a part of the function of the DSR client 100.

The audio capturer 101 captures speech and can fulfill some robust functionality for a demanding environment. The audio capturer's 101 major functions include recording, sampling a speech signal, and performing voice active detection or end-point detection.

The feature extractor 102 processes the speech data for speech features. Fundamentally, the feature extractor 102 fulfills the functionalities of MFCC and vector quantization. The feature extractor 102 typically performs a short-time Fourier analysis and extracts a sequence of observation vectors (or acoustic vectors) X=[x1, x2 . . . xt]. Many choices exist for the acoustic vectors, but the cepstral coefficients have exhibited the best performance to date. The sequence of acoustic vectors can either be modeled directly or vector-quantized first and then modeled.

The data wrapper 103: As shown in FIG. 4, there are two data wrappers 103 and 211 in one embodiment, which are located respectively at the DSR server browser 210 of the DSR gateway module 200 and at the DSR client module 100. The communication between the DSR client module 100 and the DSR gateway module 200 depends on these two data wrappers. Now, we first describe the data wrapper in the DSR client module 100. The data wrapper 103 fulfills the wrapper functionalities of connection requests, the synchronization of events, and speech feature data transmission. Specifically, the data wrapper 103 provides among the following functions: adjusting transmission control conditions according to transmission parameters; implementing the function of a Transmission Control Protocol (TCP) client; receiving DSRML data and sending an initial connect request; controlling whether or not to add Quality of Service (QoS) headers to packets according to a QoS control parameter; compressing speech features; constructing frames; adding a cyclic redundancy check (CRC) header to every frame-pair; constructing multi-frames; adding a CRC header to every multi-frame; and making User Datagram Protocol (UDP) and TCP wrappers for sending data. The interpreter 104 transfers the speech feature streams output from the feature extractor 102 to the data wrapper 103. The interpreter 104 also receives documents and events sent from the data wrapper 103 without detailed knowledge of the transmission of this data.

The interpreter 104 allocates tasks to the audio capturer 101, speech feature extractor 102, and data wrapper 103, which capture, process speech input data for features, and communicate with the server browser 211 of the DSR gateway 200, respectively. The interpreter 104 also receives display content which is organized in a document-card style. Each document contains several information cards. A user can navigate through the cards, display the card contents, and advance from one card to the next. Card navigation is controlled by the speech recognition results generated in the DSR gateway module 200 through events.

The respective components of the DSR client module 100 of one embodiment of the invention were described above. The following section provides a detailed description of the DSR gateway module 200.

As shown in FIG. 4, a major function of the DSR gateway module 200 is to get a DSRML document from the document server 300 to interpret the DSRML elements of the document, communicate with the DSR client module 100 through a wired or wireless network, dynamically generate grammar from the DSRML elements, and to control display content navigation by speech recognition. Fundamentally, the DSR gateway 200 functionality can be separated into three parts: the server browser 210, the DNS server 220, and the utility platform 230. It will be apparent to one of ordinary skill in the art that other equivalent functionality groupings are possible.

The server browser 210 interacts with the DSR client module 100 and the utility platform 230. The server browser 210 can be separated into three key components: the data wrapper 211, the Hypertext Transfer Protocol (HTTP) wrapper 212, and the interpreter 213.

When the server browser 210 receives the document content from the DSR document server 300 through the HTTP wrapper 212, the server browser 210 calls the interpreter 213 to parse the content and to allocate various tasks to the utility platform 230. These various tasks include generating display content for the client and grammar generation.

When display content has been generated in a document-card style as described above and the content has been sent to the server browser 210, the server browser 210 sends the content to the DSR client module 100 through the data wrapper 211 and 103. When the server browser 210 receives the speech features from the DSR client module 100, the server browser 210 forwards the speech features and allocates one more task to the utility platform 230 which performs speech recognition based on speech features and builds related grammar.

After speech recognition, the utility platform 230 sends the speech recognition results to the server browser 210. Finally, according to the speech recognition results, the server browser 210 sends a new display card identifier or a new document to the DSR client module 100.

The respective components of the server browser 210 are described in more detail below. The server browser 210 includes the data wrapper 211, the HTTP wrapper 212, and the interpreter 213.

Data wrapper 211 is similar to data wrapper 103 in the DSR client 100. Data wrapper 211 fulfills the jobs of receiving speech features from and sending display contents and card identifiers to the DSR client 100. Specifically, data wrapper 211 provides among the following functions: adjusting transmission control conditions according to transmission parameters; implementing the function of the TCP server; sending DSRML data and receiving an initial connection request; controlling whether or not to decompose a QoS header of received data packets according to a QoS control parameter; performing multi-frame synchronization; performing error detection and mitigation; performing feature decompression; receiving UDP packets and unwrapping them into proper formats; and receiving TCP packets and unwrapping them into proper formats.

The HTTP wrapper 212 is responsible for DSRML document requests and document transmission between the DSR document server 300 and the DSR server browser 210. This transmission is implemented using a standard HTTP conversation in one embodiment.

The interpreter 213 is the parser of DSRML. After receiving a DSRML document from the DSR document server 300, the interpreter 213 will parse the elements of a DSRML document, determine the syntax of the DSRML document, consolidate the information for the server browser 210, and assign various tasks to the utility platform 230.

The server browser 210, according to one embodiment of the invention was described above. The other two parts of the DSR gateway module 200 are described below. These other two parts include the DNS server 220 and the utility platform 230.

The DNS server 220 is implemented within the DSR gateway module 200. Using the DNS Server 220, the HTTP wrapper 212 of the DSR server browser 210 can easily and rapidly get a domain name interpretation service. The DNS server 220 caches the IP addresses of DSRML document servers while getting a domain name interpretation service from the external DNS servers.

The utility platform 230 is controlled by the server browser 210, and fulfills most of the low-level system jobs. The utility platform 230 can be separated into seven parts: the utility platform shell 231, the dynamic grammar builder 232, the transmission controller 233, the display content generator 234, the DSR speech recognition engine 235, the Text to Speech (TTS) engine 236, and the workload balance controller 237.

The utility platform shell 231 receives the various tasks from the server browser 210, allocates the tasks to specific components of the utility platform 230, and harmonizes the operation of all of the utility platform 230 components. Finally, the utility platform 231 communicates the results to the server browser 210.

The dynamic grammar builder 232 processes grammar from the speech input. In a DSR application each dialog has its own grammar, which specifies the allowable input word. Usually, the documents provide grammar as the text format of keywords without garbage from natural speech. Further, the speech recognition engine needs the compiled binary grammar to process the speech recognition. In particular, the dynamic grammar builder 232 performs among the following tasks:

extracting grammar scripts and keywords from documents.

adding garbage words for natural speaking input.

compiling the modified grammar to binary format for DSR speech recognition.

putting the binary format grammar files in cache.

The grammar builder 232 could be implemented as a tool in the speech recognition engine 235. These two components should be supplied and upgraded together, but there are many benefits if these components are separated into two components as described herein. These benefits include:

The grammar can only be compiled once and saved in cache for multiple users' threads;

Besides compiling for binary, the grammar builder 232 needs to deal with DSRML, cache, etc. Separate components can facilitate architectural design, implementation, and system management.

The display content generator 234 consolidates the display contents in DSRML documents and organizes the content into a document-card model like wireless markup language (WML), which matches with the dialog style in a DSRML document. In this manner, each dialog just matches one card with a corresponding card identifier. DSRML documents enable the interaction between the client and server using a speech input approach. The DSRML document contains the grammar script for speech recognition and the corresponding display information.

The display contents include DSRML script and other external resources such as pictures and grammar. This content is packed together and sent to the client through the network.

The transmission controller 233 mainly defines the communication model between the DSR client module 100 and the server browser 210 of the DSR gateway module 200. This component enables the use of diverse networks and protocols. The main functions of this component are to detect client type, to balance network load, and to adjust the transmission performance. Some control parameters are sent to the client at the session start. These parameters only need to be sent once. The other parameters are sent during the session, when network status changes. The control parameters might be, for example:

CRC: whether the transmission needs CRC, and what kind of CRC to use

Bandwidth: what are the bandwidth requirements for the feature transmission

Frame number: according to a particular network status, the proper number of frames to form a multi-frame according to network status.

QoS related parameters: whether a QoS header should be wrapped. Specifying the kind of QoS parameters.

These control parameters can be sent to clients in a special defined markup language format by event. For instance, The parameters sent at session start could include, for example:

```
<event type="transmission">
    <crc> </crc>
    <QoS> </QoS>
</event>
```

The parameters sent during the session could include, for example:

```
<event type="transmission">
    < framnum> 16 </framnum>
    <bandwidth>  </bandwidth>
</events>
```

The workload balance controller 237 balances processing and resource needs of the other components of the utility platform 230. The DSR gateway 200 platform consumes a large amount of power. If the capacity requirement for current users is high, it can be beneficial to balance the workload using clustering servers. In the workload balance controller 237 of one embodiment, five sub-controllers are defined, Sub-controller 1: controls the balance for the clustering servers of the dynamic grammar builder 232.

Sub-controller 2: controls the balance for the clustering servers of the Transmission Controller 233.

Sub-controller 3: controls the balance for the clustering servers of the display content generator 234.

Sub-controller 4: controls the balance for the clustering servers of the DSR speech recognition engine 235.

Sub-controller 5: controls the balance for the clustering servers of the TTS engine 236.

The DSR speech recognition engine 235 does the work of speech recognition from speech feature extractions. As the DSR speech recognition engine 235 needs binary format grammar, the dynamic grammar builder 232 must be called first.

The TTS engine 236 expands the system to support text input. Sometimes, the display approach in audio format is efficient and user preferred. As such, TTS technology is supported in the present invention.

The components of one embodiment of a comprehensive, practical, and efficient architecture for a DSR client and server development platform were described above by reference to FIG. 4. In addition to the respective components of the system development platform, the synchronization process for the DSR client 100 and the gateway 200, and the definition for a DSR markup language are detailed below.

Figure 5:
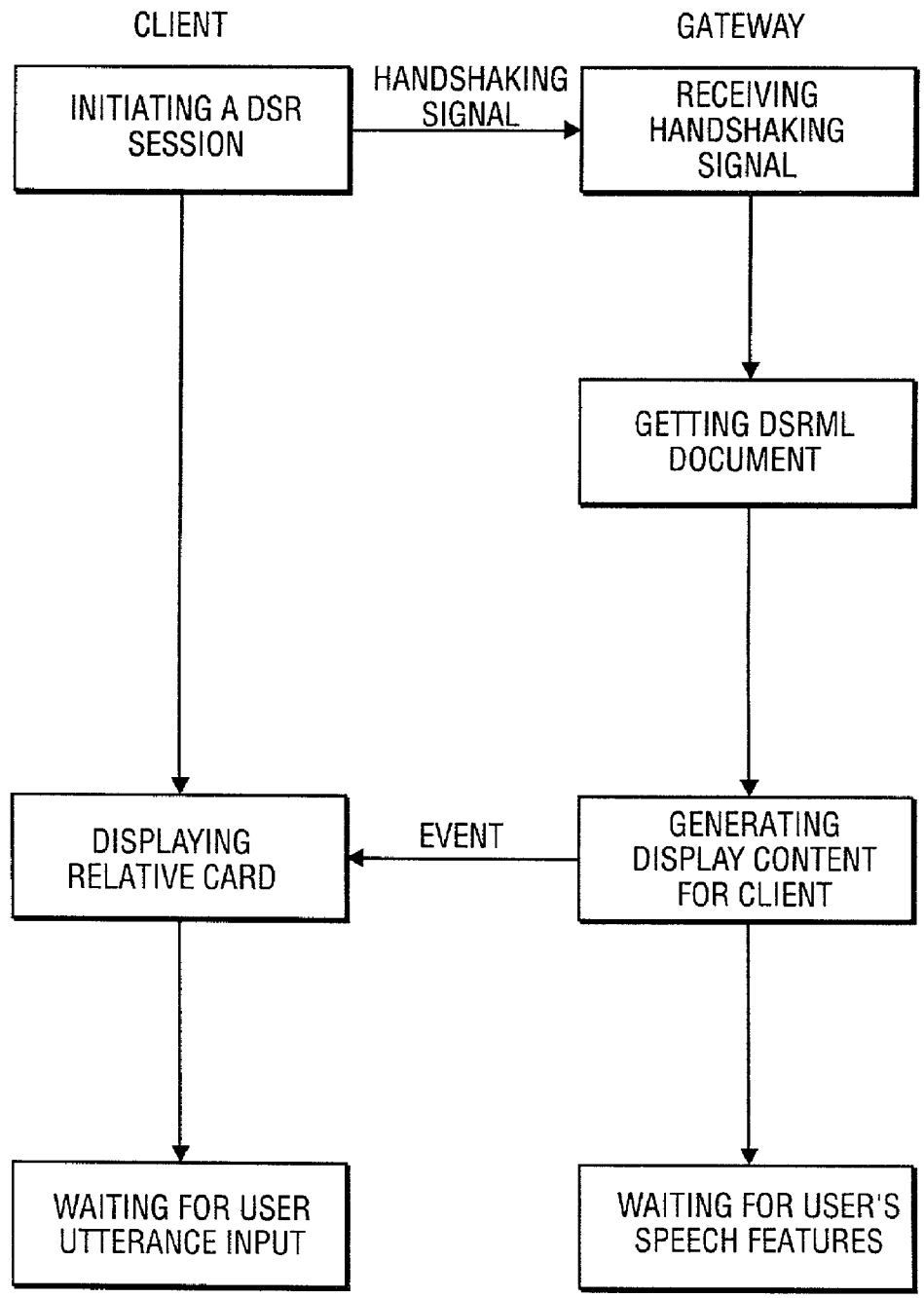
FIGS. 5–7 illustrate the system synchronization design between the DSR client module and the DSR gateway module.
Figure 6:
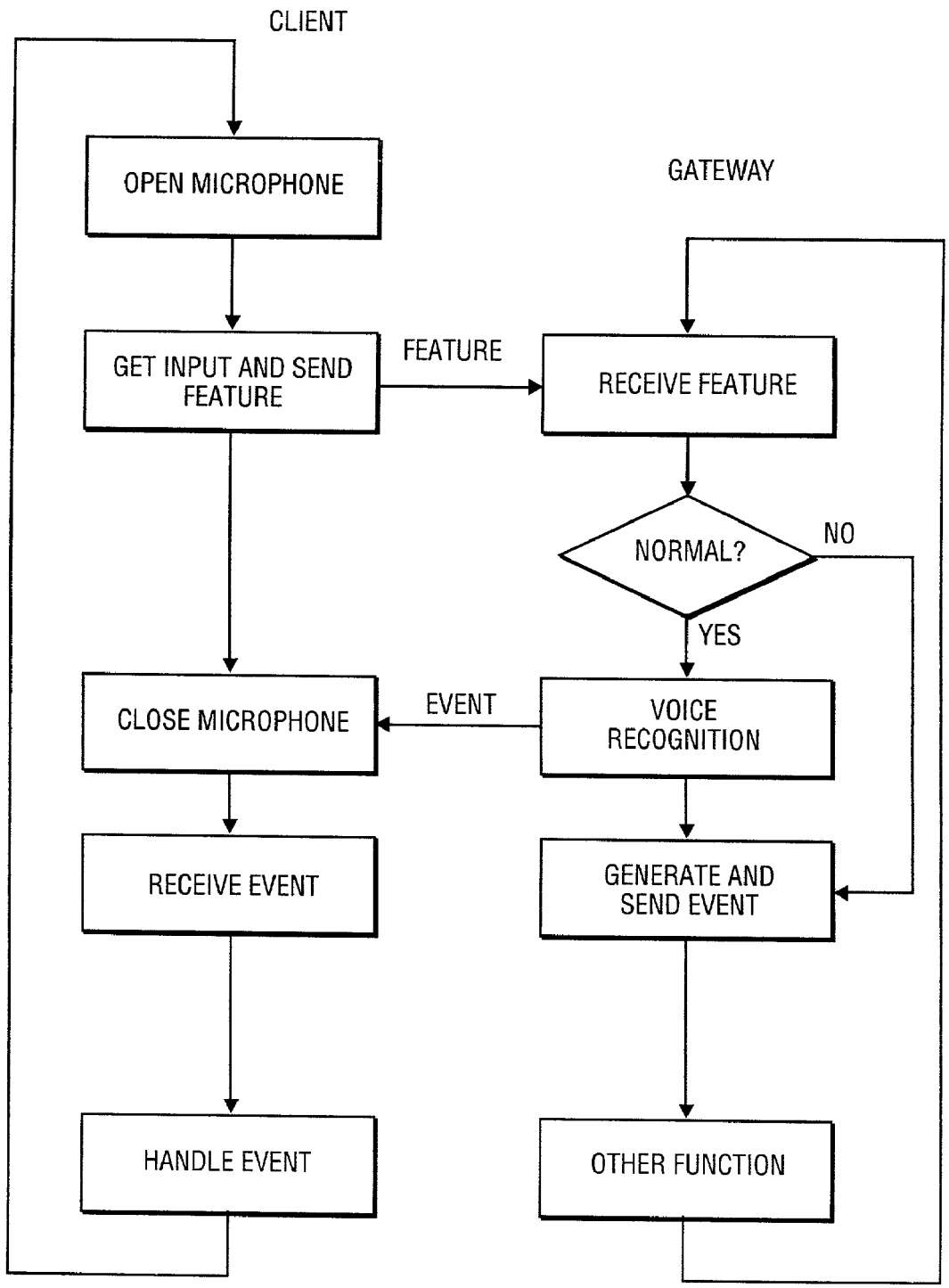
Figure 7:
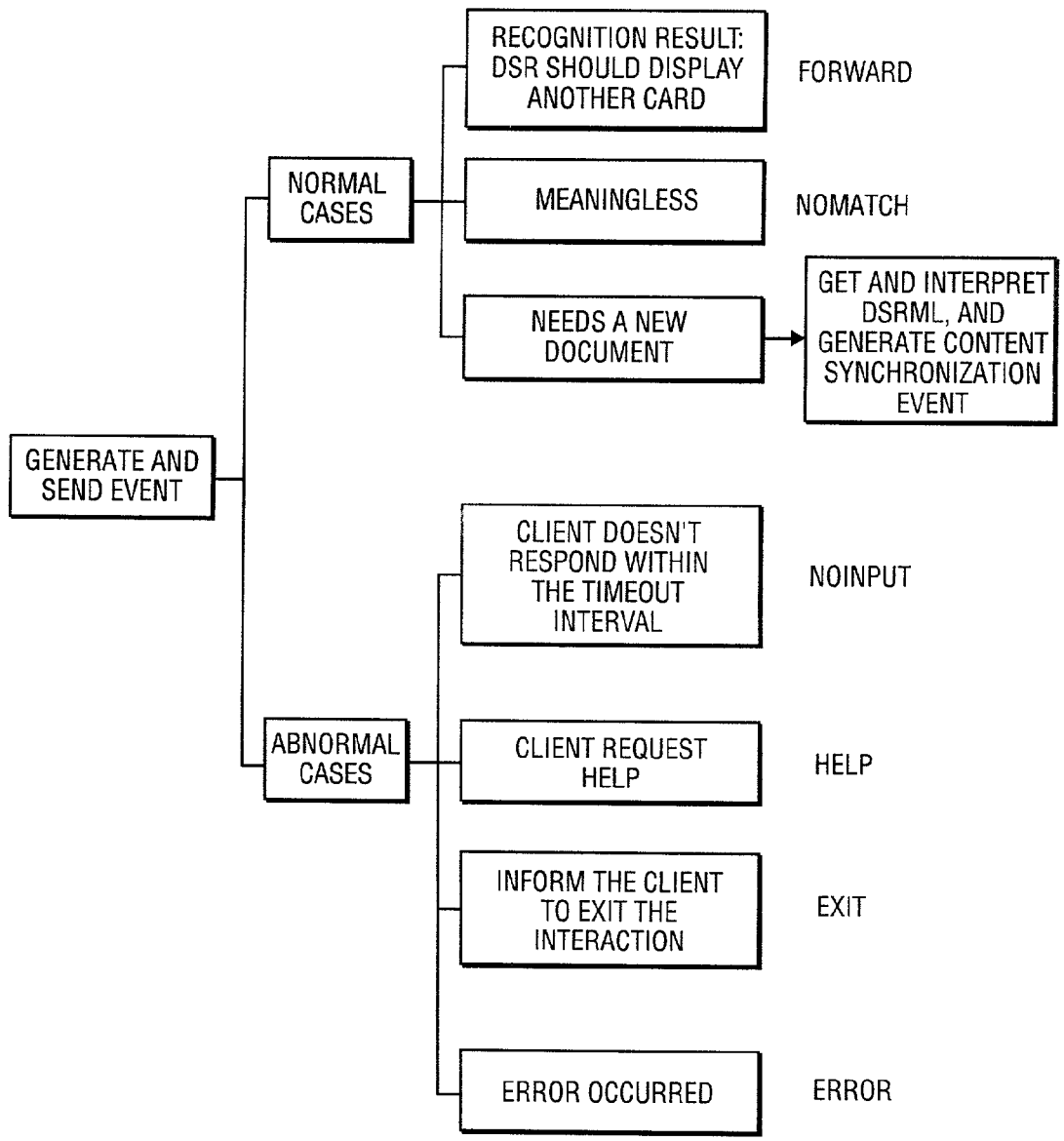

FIGS. 5-7 illustrate the synchronization process for the DSR client 100 and the gateway 200 used in one embodiment of the present invention.

In the DSR development platform of the present invention, events are used to control all the interactions between the DSR client module 100 and the DSR gateway module 200. Two fundamental types of events are defined for the synchronization between the DSR client module 100 and the DSR gateway module 200. The events include:

system synchronization events (for normal and abnormal cases).

content synchronization events (only for abnormal cases).

System Synchronization Events

System synchronization events are defined to inform the client of what has happened and of what to do next. The system synchronization events are sent from the DSR gateway 200 to the DSR client 100 in response to triggers or circumstances including the following:

client doesn't respond within the timeout interval.
    client doesn't respond intelligibly.
    client requests help.
    inform the client to move on to next dialog.
    error occurred (such as semantic error in the document).
    inform the client to exit the interaction.

According to the above triggers or circumstances, the corresponding types of system synchronization events include the following:

>The system synchronization event types in normal cases:
    Ready: The server is ready to receive input.
    Forward: The message for the next display card ID.
    >The system synchronization event types in abnormal cases:
    Noinput: Default message.
    Nomatch: Default message.
    Help: Default message.
    Error: Default error message. In this case, the DSR gateway 200 will exit.
    Exit: Default message. In the case, the DSR gateway 200 will exit.

The system synchronization events are generated at the DSR gateway 200 and organized as markup language format. For example, when the DSR gateway 200 finishes the recognition of one input, the DSR gateway 200 will transit to a next dialog and inform the DSR client 100 to show the corresponding next card. Thus, the "forward" synchronization type of event will be sent to the DSR client 100, and the related display card ID will be sent through a <message>element. An example of this type of event is as follows:

```
<event type="forward">
    <message> #city </message>
</event>
```

Content Synchronization Events

Content synchronization events are used to deal with the abnormal cases according to the procedure pre-defined in DSRML script to cope with the abnormality. These types of content synchronization events include:

Help: The messages for the help for which the user asked.
    Noinput: The message for no response within the timeout interval.
    Nomatch: The message for no correct recognition result.
    Error: The message for some other error related to application execution.

The content synchronization events are interpreted by the gateway DSR 200. For instance, in the case of a wrong recognition result during the interaction, the DSR gateway 200 may transfer to another dialog and inform the client to show the related card. Thus, based on the content synchronization event, the system synchronization event "forward" will be generated and sent to the DSR client 100. Following are example scripts.

The script of the nomatch content synchronization event that will be interpreted by the DSR gateway 200 as follows:

```
<event type="nomatch">
<goto href="#card_id"/>
</event>
```

The script of the nomatch system synchronization event generated by the DSR gateway 200 according to the script of a content synchronization event as follows:

```
<event type="forward">
<message>#card_id </message>
</event>
```

FIGS. 5–7 illustrate the synchronization process between the DSR client module and the DSR gateway module.

As shown in FIG. 5, during the setup procedure, when initiating a DSR session from the DSR client module 100, the DSR gateway module 200 receives a handshaking signal and sends a DSRML request to the DSR document server 300 with the help of the DSR DNS server 220. After getting the DSRML document from the DSR document server 300, the DSR gateway module 200 parses the document and generates display content for the client. In order to inform the DSR client module 100 that the DSR gateway module 200 is ready for the user's speech input, the DSR gateway module 200 sends the normal event "Ready" to the DSR client module 100 with the related card identifier.

As shown in FIG. 6, during the communication procedure, if speech features are received normally, the DSR gateway module 200 generates and sends the normal event (Forward) according to the speech recognition result. If speech features cannot be received normally, such as the result of a timeout, the DSR gateway module 200 generates an abnormal system synchronization event.

FIG. 7 illustrates the details for generating and sending events from the DSR gateway module 200. As shown, the handling of both normal and abnormal events is provided.

In the DSR application system of the present invention, the interaction model between the client and gateway is voice and visual through heterogeneous networks. As such, the definition of the DSR markup language that provides voice-visual interaction between clients and the gateway is important. An embodiment of this DSRML definition of the present invention is provided below. In general, the DSRML should provide functionality to recognize spoken input, navigate among related document-cards, and provide speech synthesis for displaying content in audio format.

The DSRML language of one embodiment of the present invention provides a means for collecting spoken input, assigning the input to document-defined request variables, and making decisions as to how to execute the DSRML documents based on the user's input. A document may be linked to other documents through Universal Resource Identifiers (URIs).

The Consideration of Client Device Types

In one embodiment, DSRML is designed to meet the constraints of a wide range of small, narrowband client devices. These client devices are primarily characterized in some of the following ways:

Display size—small screen size and low resolution. A small mobile device such as a phone may only have a few lines of textual display, each line containing 8–12 characters.

Input devices—voice input plus other limited or special-purpose input methods. The phone typically has a numeric keypad and a few additional function-specific keys. The more sophisticated device may have software-programmable buttons, but may not have a mouse or other pointing device.

Computational resources—low power CPU and small memory size; often limited by power constraints.

Narrowband network connectivity—low bandwidth and high latency. Devices with 300 bps to 10 Kbps network connections and 5–10 second round-trip latency are not uncommon.

The Consideration of the Definition for DSR Markup Language

A DSRML document forms a conversational finite state machine. The user is always in one conversational state, or dialog, at a time. Each dialog determines the next dialog to which the user transitions.

Dialogs

In one embodiment of the present invention, there are two kinds of dialogs: link and submit. If the dialog's type attribute is "submit", usually it has a <submit> element. The dialog is used to collect values for each of several <input> item variables.

The <dialog> may specify a grammar that defines the allowable word for the input. The user must provide values for <input> variables before proceeding to the <submit> element in the dialog.

Another dialog type is "link". In this dialog, there is no specified <input> element; but there are links in the display contents. The dialog is used to transit to another dialog through the links. Each link may also specify a grammar.

Application

An application is a set of documents sharing the same application root document. Whenever the user interacts with a document in an application, its application root document remains loaded while the user is navigating between other documents in the same application. The root document is unloaded when the user navigates to a document that is not in the application. While it is loaded, the application root document's grammars can be set to remain active during the application.

Grammar

Each dialog has one or more speech grammars associated with it. In server browser directed applications, each dialog's grammars are active only when the user is in that dialog. Both the <input> element and the <link> element need at least one grammar.

Display

In a typical DSRML application, the documents contain text and pictures as the display contents. The display content in each dialog is organized as a card showing in the mobile client. Each dialog corresponds to one card, and vice versa. There is a specific element named "display" containing all the visual contents.

Event

In a typical DSRML application, the system may generate events, including nomatch, time expiration, and user requested help. By default, the system handles all these events, not needing to define them in a document. But, if we have defined them in a DSRML document as content synchronization events, the defined element, such as <event> and/or <help>, will be executed, for example, sending a warning message to the client.

The DSR platform of the present invention provides several advantages over the prior art. Specifically, software vendors can develop better components and tools for the platform using the architecture definition provided herein. Client manufacturers can use the components in the client platform to independently develop DSR handheld devices; Internet Service Providers (ISP) or telecom operators can use the definition and develop components for the server platform to integrate with the DSR gateway; and ICP (Internet content provider) can use the DSR-XML definition and edit tools in the platform to develop DSR service content.

In one aspect of the present invention, a DSR system development platform based on client-server framework, includes:

DSR client module for capturing speech, extracting speech features, interpreting markup contents and display content for presentation on a display screen, and communicating with a DSR gateway module;

DSR gateway module for receiving a markup document from a DSR document server, interpreting the tag elements of the markup document, dynamically generating grammar from the markup document, controlling display content navigation by speech recognition, and communicating with the DSR client module and a DSR document server; and DSR document server for processing requests from the DSR gateway module and producing DSRML documents in response.

In another aspect of the invention, a method for accessing documents by speech in a DSR system based on the above described platform, includes the components:

DSR client performing front-end processing and sending the speech feature data to a DSR gateway;

after receiving the speech feature data from the DSR client, the DSR gateway performs speech recognition and various other tasks including:

if the speech recognition result means that the DSR client should display another component of the current document, the DSR gateway will send an event to the DSR client with the identifying information of related component, then the DSR client will display this component of the current document;

if the speech recognition result is meaningless or undecipherable, the DSR gateway sends a corresponding event to the DSR client; and if the speech recognition result means that the DSR client needs a new document, the DSR gateway sends a DSRML request to the DSR document server; after receiving the needed DSRML document, the DSR gateway parses the DSRML document, compiles all the grammars that the speech recognition engine needs, generates display content for client, and then sends the display content to the DSR client.

Thus, an inventive DSR client and server development platform including a DSR client module, DSR gateway module, and DSR document server is disclosed. The scope of protection of the claims set forth below is not intended to be limited to the particulars described in connection with the detailed description of presently preferred embodiments. Accordingly, the present invention provides a comprehensive, practical, and efficient architecture for a DSR client and server development platform.

What is claimed is:

1. A system comprising:
   DSR client module for capturing speech, extracting speech features, sending the speech features, interpreting markup content and displaying content;
   DSR gateway module coupled for communication with the DSR client module, the DSR gateway module for receiving the speech features and a DSR markup document, interpreting tag elements of the DSR markup document, and dynamically generating grammar from the DSR markup document, and controlling display content navigation of the DSR markup document by distributed speech recognition, wherein the DSR client module sends speech features to the DSR gateway module via a network; and
   DSR document server coupled for communication with the DSR gateway module, the DSR document server for processing requests from the DSR gateway module and for producing the markup document in response.

2. The system of claim 1, wherein said DSR client module includes at least one of an audio capturer, a feature extractor, a data wrapper and an interpreter, each of which performs a part of the function of the DSR client module.

3. The system of claim 2, wherein said audio capturer records speech, samples speech signals, and performs voice active detection or end-point detection.

4. The system of claim 2, wherein said feature extractor performs MFCC and vector quantization.

5. The system of claim 2, wherein said data wrapper performs processing of a connection request, processes events for synchronization, receives display content, and transmits speech feature data.

6. The system of claim 2, wherein said interpreter allocates tasks to the audio capturer, speech feature extractor, and data wrapper, and interprets markup document content.

7. The system of claim 1, wherein said DSR gateway module includes at least one of a server browser, a DNS server, and a utility platform, each of which performs a part of the function of DSR gateway module.

8. The system of claim 7, wherein said server browser includes at least one of a data wrapper, an HTTP wrapper, and an interpreter, each of which performs a part of the function of said server browser.

9. The system of claim 8, wherein said data wrapper parses the markup document, determines the syntax of the markup document, and consolidates the information for the server browser, and assigns tasks to the utility platform.

10. The system of claim 8, wherein said HTTP wrapper processes a markup document request and document transmission.

11. The system of claim 7, wherein said utility platform is controlled by said server browser and performs various system jobs.

12. The system of claim 11, wherein said system jobs include speech recognition, TTS conversion, dynamic grammar building, display content generation, and transmission and workload balance control.

13. The system of claim 1, wherein events are used for synchronization between said DSR client module and said DSR gateway module.

14. The system of claim 13, wherein said events include system synchronization events and content synchronization events.

15. A method comprising:
   a DSR client performing front-end speech processing; the DSR client sending speech feature data to a DSR gateway via a network;
   the DSR client receiving via the network a first event from the DSR gateway with identification information for a first component if a distributed speech recognition result performed by the DSR gateway indicates that the DSR client is to display the first component of a current DSRML document;
   the DSR client displaying the first component of the current document;
   the DSR client receiving via the network a second event from the DSR gateway if the distributed speech recognition result is non-decipherable; and
   the DSR client receiving via the network the display content from the DSR gateway.

16. The method of claim 15 further comprising the DSR client adjusting transmission control conditions according to transmission parameters.

17. A method comprising:
   a DSR gateway receiving speech feature data from a DSR client via a network;
   the DSR gateway performing distributed speech recognition of the speech feature data from the DSR client;
   the DSR gateway sending via the network a first event with identification information for a first component to the DSR client if a distributed speech recognition result indicates that the DSR client is to display the first component of the current DSRML document;
   the DSR gateway sending via the network a second event to the DSR client if the distributed speech recognition result is non-decipherable; and
   the DSR gateway sending via the network a DSRML request to a DSR document server if the distributed speech recognition result indicates that the DSR client needs a new document.

18. The method of claim 17 further comprising the DSR gateway adjusting transmission control conditions according to transmission parameters.

19. The method of claim 18, wherein adjusting transmission control conditions according to transmission parameters includes adjusting bandwidth.

20. The method of claim 17 further comprising:
   the DSR gateway parsing the DSRML document;
   the DSR gateway compiling all grammars that for speech recognition engine;
   the DSR gateway generating display content for the DSR client; and
   the DSR gateway sending via the network the display content to the DSR client, wherein sending the display content includes adjusting transmission control conditions according to transmission requirements.

21. A machine readable medium having stored thereon executable code which causes a machine to perform the method comprising:
   performing front-end speech processing;
   sending speech feature data to a DSR gateway via a network;
   receiving via the network a first event from the DSR gateway with identification information for a first component if a distributed speech recognition result indicates that the DSR client is to display the first component of the current DSRML document;

displaying the first component of the current document;

receiving via the network a second event from the DSR gateway if the distributed speech recognition result is non-decipherable; and receiving the display content from the DSR gateway.

22. The machine readable medium of claim 21, wherein the executable code further includes the:

adjusting transmission control conditions according to transmission parameters.

23. A machine readable medium having stored thereon executable code which causes a machine to perform the method comprising:

receiving speech feature data from a DSR client via a network;

performing distributed speech recognition of the speech feature data from the DSR client;

sending via the network a first event with identification information for a first component to the DSR client if a distributed speech recognition result indicates that the DSR client is to display the first component of the current DSRML document;

sending via the network a second event to the DSR client if the distributed speech recognition result is non-decipherable; and sending via the network a DSRML request to a DSR document server if the distributed speech recognition result indicates that the DSR client needs a new document.

24. The machine readable medium of claim 23, wherein the executable code further includes:

adjusting transmission control conditions according to transmission parameters.

25. The machine readable medium of claim 24, wherein adjusting transmission control conditions according to transmission parameters includes adjusting bandwidth.

26. The machine readable medium of claim 23, wherein the executable code further includes:

parsing the DSRML document;

compiling all grammars that for speech recognition engine;

generating display content for the DSR client; and sending via the network the display content to the DSR client, wherein sending the display content includes adjusting transmission control conditions according to transmission requirements.

* * * * *